May 13, 1952 F. J. FOUST ET AL 2,596,396
CONDENSER TESTING SYSTEM
Filed July 29, 1946 6 Sheets—Sheet 1
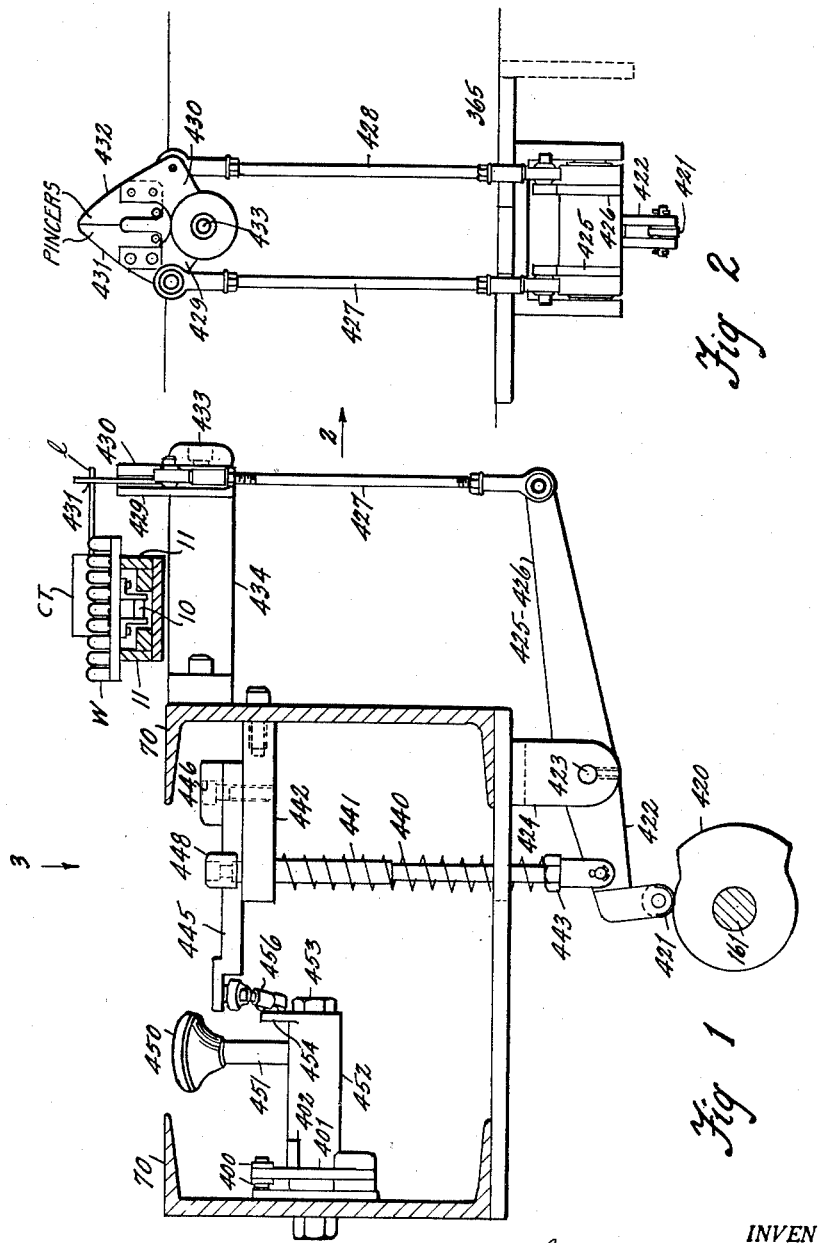
INVENTORS
James S. Burge, Floyd J. Foust
Willard C. Shaw, Hilton J. McKee
BY Warren M. Rider
Spencer Hardman & Fehr
their attorneys.

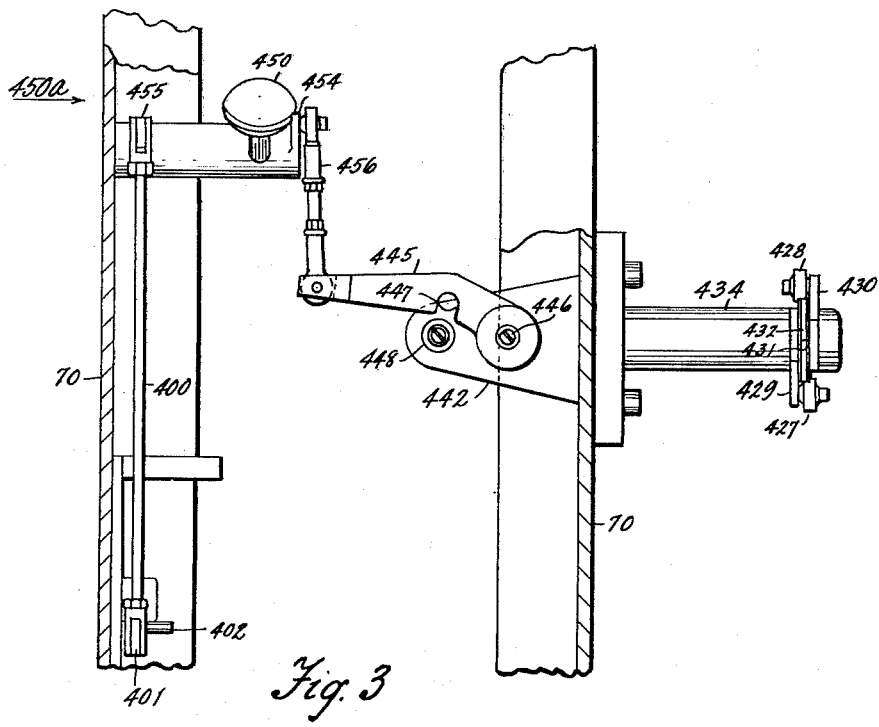

CAM TIMING CONTROL

D.C. VOLTAGE SUPPLY
500-750 VOLTS

Patented May 13, 1952

2,596,396

UNITED STATES PATENT OFFICE 2,596,396

CONDENSER TESTING SYSTEM

Floyd J. Foust, Willard C. Shaw, Hilton J. McKee, Warren M. Rider and James S. Burge, Anderson, Ind., assignors to General Motors Corporation, Detroit, Mich., a corporation of Delaware Application July 29, 1946, Serial No. 686,964

7 Claims. (Cl. 175—183)

This invention relates to the manufacture of electrical condensers and more particularly to condenser having a foil winding enclosed in a metal can to which one foil of the condenser is electrically connected, the other foil being electrically connected to a wire extending from the can and insulated therefrom.

The invention relates more particularly to testing apparatus used with a machine which facilitates the attachment of a terminal clip to the condenser lead wire and the welding of the clip to the wire and the inspection of the condenser. This machine provides an intermittently operating conveyor having work holders for receiving the condensers, a punch press for forming a terminal clip and attaching it to a condenser wire when the condenser has been conveyed to the clip attaching station and an electric welding apparatus which applies electrodes to the clip and wire and causes a welding current to pass when the condenser has been conveyed to the clip welding station. As the condensers are conveyed from a loading station toward the clip attaching station they are automatically tested for capacity and short-circuit; and those condensers which do not pass the tests are automatically ejected from the conveyor. The machine provides means for operating the conveyor, press, welding and testing apparatus in timed relation. The machine provides counters counting the good condensers, those which fail in short-circuit test and those which fail in the capacity test. The completed, good condensers are ejected from the conveyor into a chute from which they descend into a box.

Further objects and advantages of the present invention will be apparent from the following description, reference being had to the accompanying drawings, wherein a preferred embodiment of the present invention is clearly shown.

In the drawings:

Fig. 1 is a sectional view of the machine showing means for electrically connecting the testing apparatus with the lead wire of the condenser to be tested.

Fig. 2 is a view in the direction of arrow 2 of Fig. 1.

Fig. 3 is a view in the direction of arrow 3 of Fig. 1.

Figure 4:
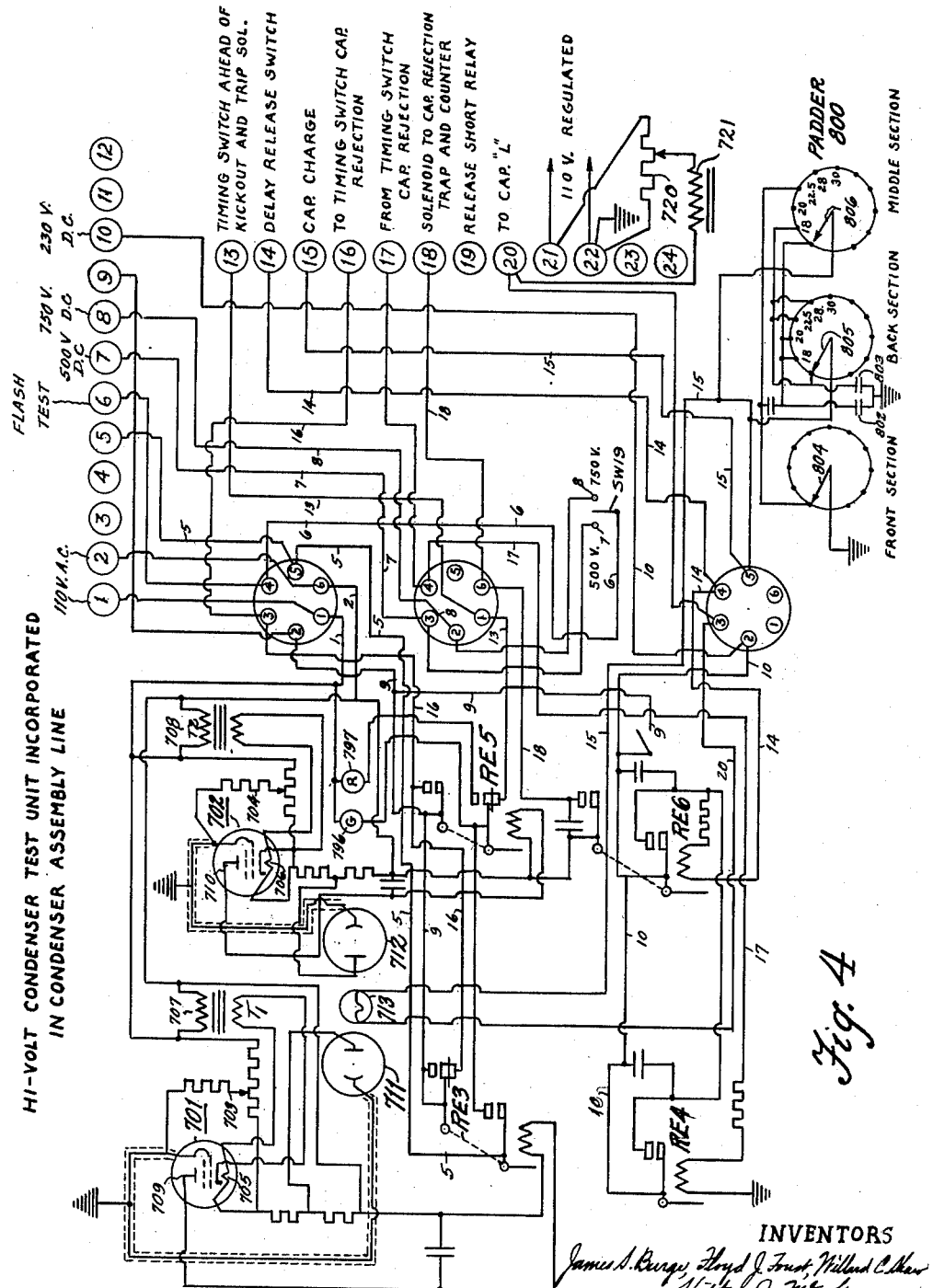
Figs. 4–8 are winding diagrams of the condenser testing apparatus.

Referring to Fig. 1, which shows, in section, a conveyor chain 10 which moves work holders —W— along a conveyor track 11, each work holder receives a condenser CT to be tested from which extends a lead wire 1.

Fig. 1 shows a cam 420 driven by shaft 161 and engageable with a roller 421 carried by a lever 422 pivoted at 423 on a bracket 424 supported by the plate 365. Lever 422 includes arms 425 and 426 (Fig. 2) connected respectively by links 427 and 428 with levers 429 and 430 respectively pivoted at 433 upon a bracket 434 attached to channel 70 of the machine frame and provided respectively with insulatingly supported pincer jaw plates 431 and 432 for engaging the bared end of the condenser lead wire 1 (Fig. 1). Plates 431, 432 are connected with a wire leading to the testing apparatus which will be described later. The lever 422 is urged counterclockwise by a spring 440 surrounding a rod 441 attached to the lever 422 and supported by a bracket 442 attached to the channel 70. Spring 440 is confined between brackets 442 and a shoulder or nut 443 of the rod 441. The cam 420 opens the jaws 431, 432 by a clockwise movement of the lever 422 against the action of spring 440. To hold the jaws open when the testing apparatus is not being used, there is provided a lever 445 pivoted at 446 on bracket 442 (Fig. 3). Lever 445 has a notch 447 for receiving the rod 441, said notch being narrower than the head 448 attached to the rod. Therefore, if the jaws are opened, as a result of clockwise movement of lever 422 and upward movement of rod 441, the head 448 will be above the upper surface of the lever 445 and if this lever is then moved counterclockwise (Fig. 3) the notch 447 will receive the rod 441 and the head 448 will be above the lever 445 so that the spring cannot return the lever 422 to the position shown in Fig. 1 although the cam 420 would be in position to permit the spring to do so. Therefore, the jaws 431 and 432 will be held apart. The lever 445 is controlled by moving a knob 450 provided by an arm 451 extending from a tubular shaft 452 pivoted at 453 upon a channel 70 and having arms 454 and 455. Arm 454 is connected by a link 456 to an arm 455. Arm 455 is connected by the rod 400 with the lever 401 which carries a pin 402 which is associated with a mechanism not shown for disabling an ejector of defective condenser. When the knob 450 is moved clockwise looking in the direction of arrow 450a (Fig. 3) at the time rod 441 is up (Fig. 1), the jaws 431, 432 are not allowed to grip the condenser lead and the ejector is disabled.

*Testing apparatus*

Each condenser is tested for short circuit by a high voltage D. C. (flash) test. If an appreciable direct current passes through the condenser, an ejector M is caused to operate to remove the bad condenser from the conveyor and it will pass down a chute. If no appreciable direct current passes through the condenser, it remains a charged condenser until discharged during the R—C (resistance-capacity) test. If its discharge is unsatisfactory it will be ejected. If it passes the discharge test as well as the short circuit test, a circuit of the low and high capacity test is established. It will pass the low and high capacity test provided it will pass current between certain low and high values when connected in a resonant circuit which may comprise, for example, a source at 110 volts A. C., a voltage divider, an inductance, a lamp and the condenser. For example, the lowest allowable capacity can be when the condenser passes .18 milliampere, and the highest allowable capacity when the condenser passes .23 milliampere. The ability of the condenser to pass current when discharging in the resonant circuit is determined by the candlepower of the lamp whose rays are directed upon two photo-electric cells respectively controlling the grid biases of two thyratron tubes which effect a control over apparatus which will cause the ejector to remain non-operative to remove the condenser (which has passed the flash test) provided it passes current in the resonant circuit between the low and high limits. If the condenser passes too little or too much current, the tubes cause the ejector to operate to remove the condenser from the conveyor. The machine sorts condensers failing in the capacity test from those which fail in the short test.

Figure 5:
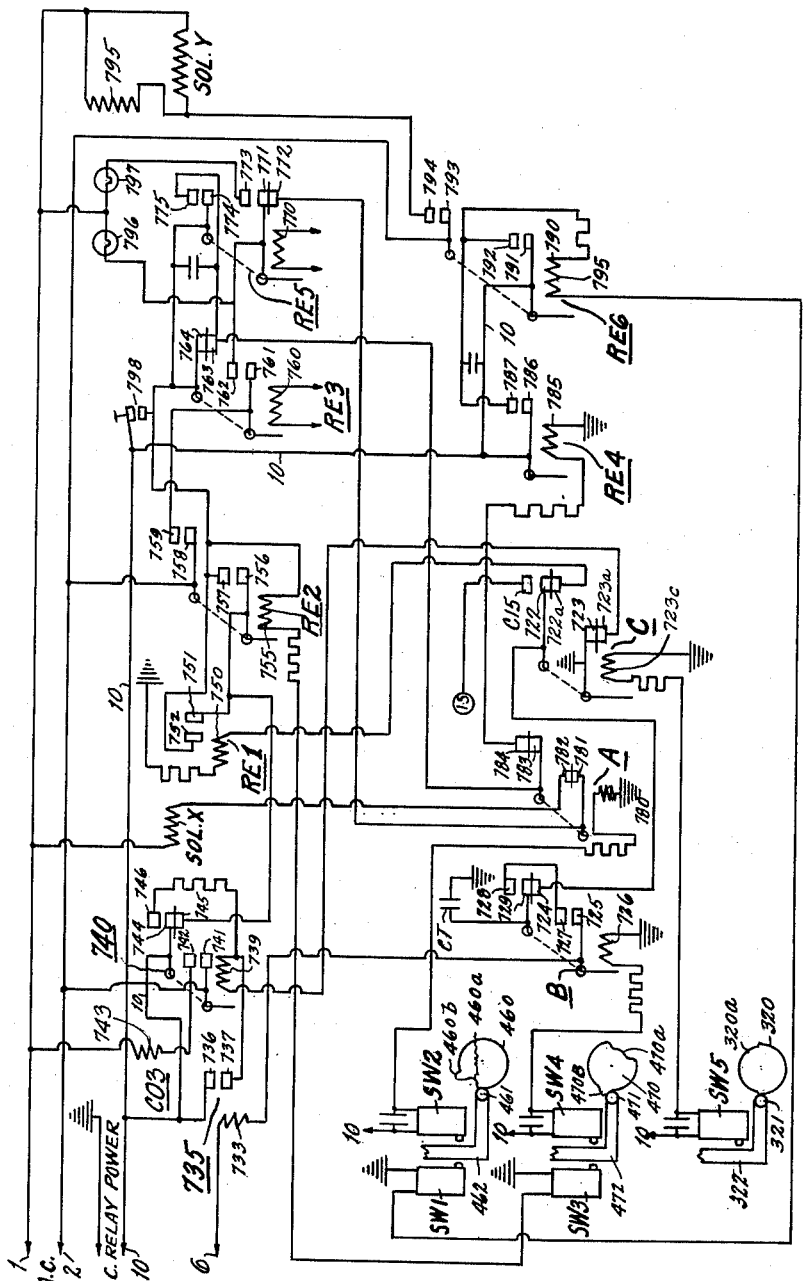
Figure 6:
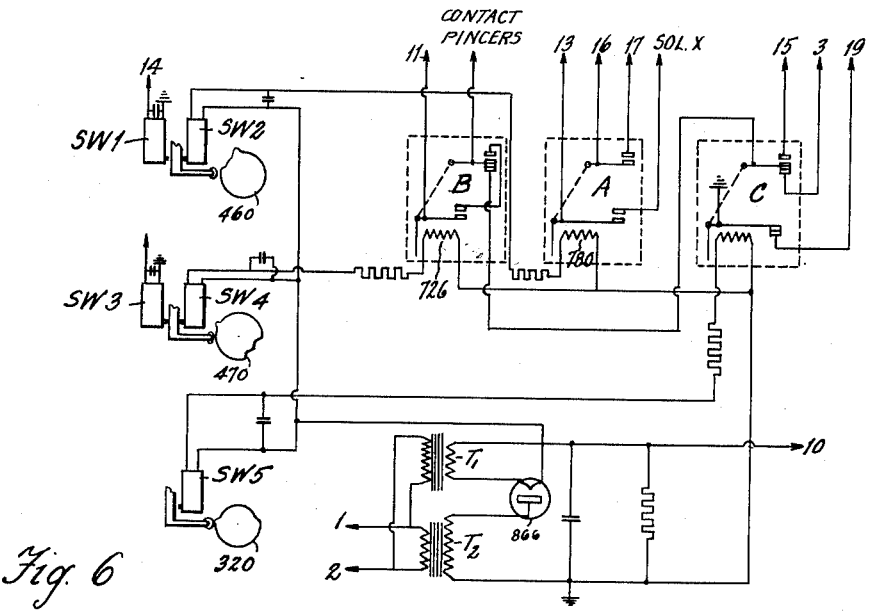

Lines 1 and 2 (Figs. 4 to 8) receive 110 volts A. C. and supply energizing current to various solenoids and A. C. input to the power pack in Fig. 7. Line 10 (Figs. 4 to 8) receives 230 volts D. C. Lines 21 and 22 (Fig. 4 and circuit VIII, Fig. 8) are connected with a source of regulated voltage at 110 volts A. C., and are connected as shown in Fig. 4 with a voltage divider 720 connected with inductance 721 connected with line 20 connected in Fig. 4 with capacity responsive lamp 713 connected with line 15. In Fig. 5 line 15 connects with contact c15 of relay C. When the coil 723c of relay C is energized, its movable contact 722 separates from contact 722a and engages contact c15. Contact 722 is connected with contact 724 of relay B connected with the pincer jaws 431 and 432 (Fig. 2) which grip the bare head of the condensers CT to be tested. Thus condenser CT (capacity) is connected in a resonant circuit which includes inductances 721 and a 60-cycle, alternating current source. The amount of current which the condenser CT will pass when connected into the resonant circuit is an indication of its capacity. The candle-power of lamp 713 in the circuit depends on the amount of current passed by the condenser. The tube 701 is so adjusted that it will pass current through its plate 709 when the current passed by CT is at the low limit or higher. The tube 702 is so adjusted that it will pass current only when the current passed by CT exceeds the high limit. For example, the low limit may be .23 milliampere indicating the lowest permissible capacity of the condenser CT; and the high limit may be .28 milliampere indicating the highest permissible capacity of the condenser CT.

If the limits of current passed are to be .23 and .28 milliampere, calibrating condensers, respectively, for passing .23 ma. and .28 ma. are connected with line 15 by switches not shown. While the condenser known to pass .23 ma. in the resonant circuit is connected into line 15, grid bias adjuster 703 is adjusted until tube 701 just begins to pass current, then the adjustment is "backed off" until the tube 701 just fails to pass current. While the condenser known to pass .28 ma. in the resonant circuit is connected into line 15, grid bias adjuster 704 is adjusted until tube 702 just begins to pass current. If the capacity of condenser CT is below the minimum, tube 701 does not pass current and a control circuit is caused to operate to effect ejection of the condenser by an ejector not shown. If the capacity of condenser CT is above the minimum, tube 701 will pass current; but, if the capacity is below the maximum, tube 702 will not pass current and the control circuit is so conditioned that the ejector will be disabled so that the good condenser will not be ejected when the time for ejection arrives. However, if the capacity is above the maximum, tube 702 will pass current and the control circuit will be conditioned for permitting the ejector to remove the condenser and a trap valve will be operated to cause the condenser to be diverted from a chute through which short test failures descend to a chute in which capacity test failures descend.

Figure 7:
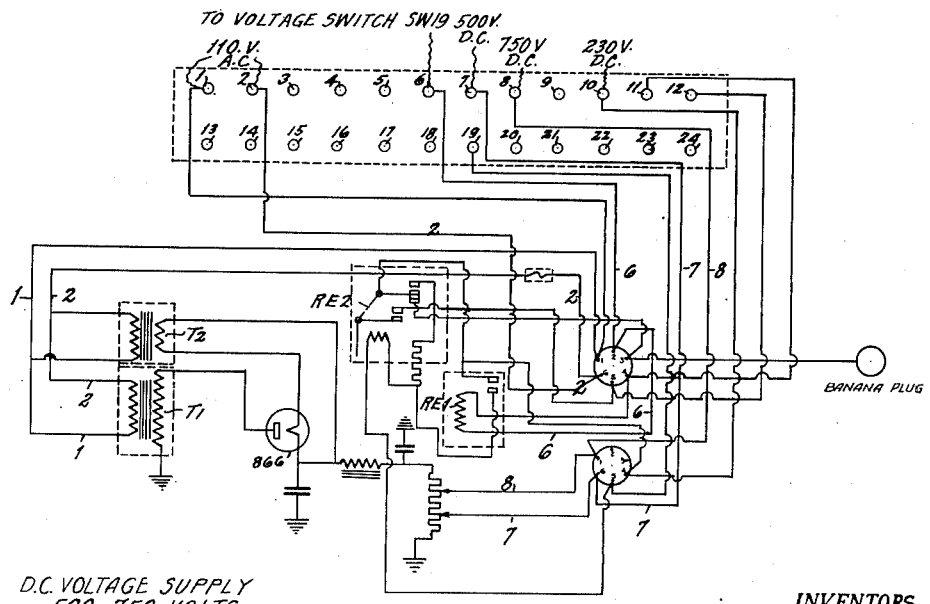
Figure 8:
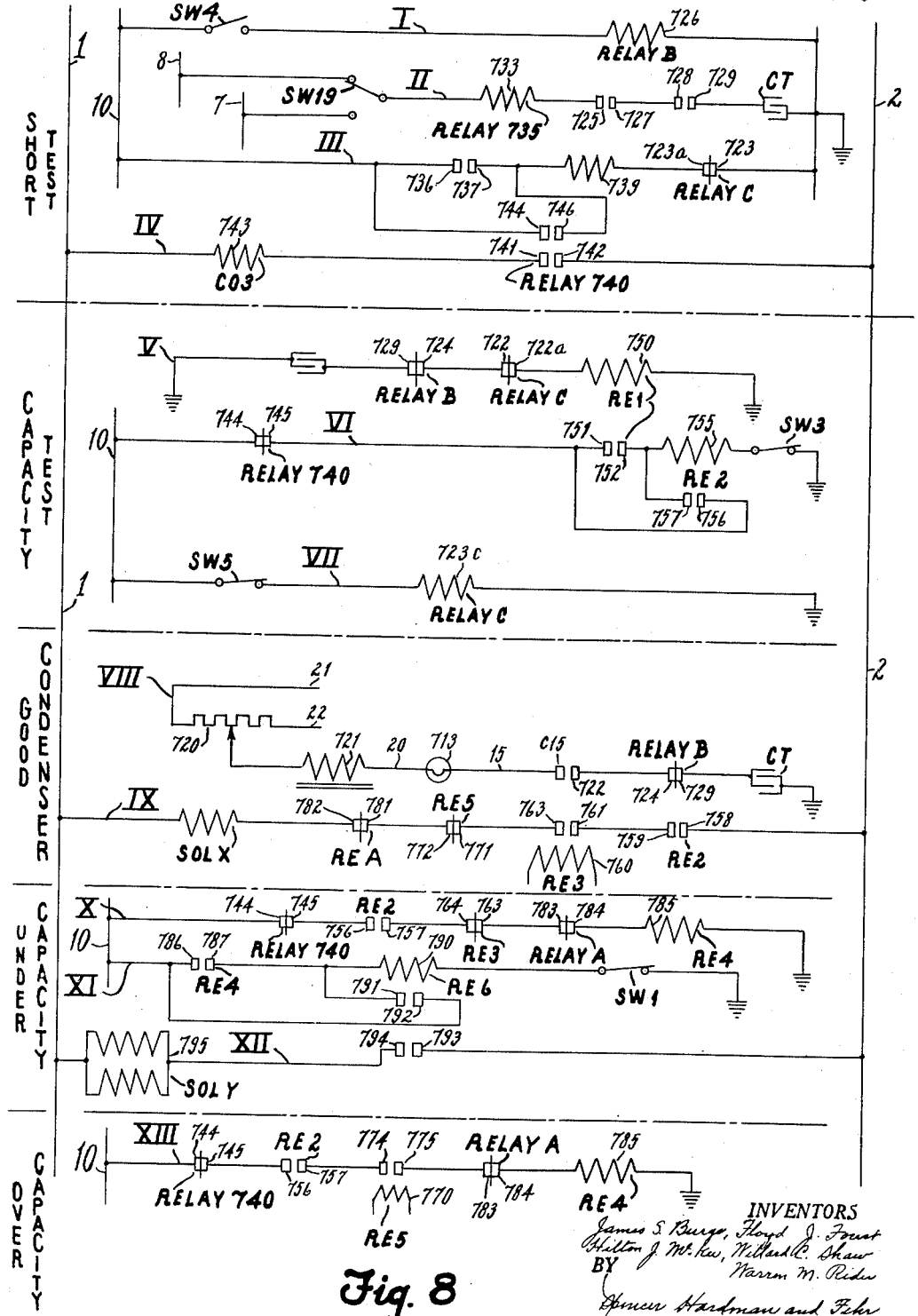

Before the capacity test the condenser CT is subjected to a high voltage (500 or 750 volts D. C.) flash test for short circuit. For this purpose a D. C. power supply (Fig. 7) receives 110 v. A. C. from lines 1 and 2 and delivers 500 v. D. C. to line 7 or 750 v. D. C. to line 8. Switch SW19 (Fig. 4) connected with line 6 can be connected either with line 7 or line 8 depending on which flash test voltage is desirable. Fig. 5 (left) shows that line 6 is connected with magnet coil 733 of a flash test relay 735 connected with movable contact 725 of relay B whose coil 726 is energized when switch SW4 is closed by action of cam 470 in order to connect coil 726 with line 10 (230 volts D. C.) connected with line 10 of the D. C. power pack (Fig. 7). When relay B is energized contact 725 engages contact 727 connected with contact 728 and contact 728 is engaged by contact 729 connected with the lead of condenser CT through the pincers. If CT passes an appreciable amount of current, coil 733 of relay 735 is energized and contact 736 engages contact 737 and coil 739 of holding relay 740 is energized and contact 741 engages contact 742 to connect solenoid 745 of short counter CO3 with A. C. lines 1 and 2, and contact 744 leaves contact 745 and engages 746 and a circuit independent of contacts 736, 737 of relay 735 is established from line 10 to ground through contacts C19 and 723 of relay C (then closed since relay C is not then energized). If the condenser CT does not pass the flash test, solenoid X is not energized for reasons which will become apparent later and the condenser is ejected.

The following paragraphs describe the cycles of testing the condenser CT.

(A) Cycle for testing a good condenser. Cam 470 closes switch SW4 (circuit I, Fig. 8) and coil 726 of relay B is connected with line 10. Relay B is energized. Contact 725 engages 727 and contact 729 engages 728 and condenser CT is connected with coil 733 of relay 735 (circuit II, Fig. 8). Since CT has no short circuit through it, direct current does not flow and coil 733 is not energized. Contact 736 does not engage 737. Holding relay 740 is not energized. Condenser CT is charged. Switch SW4 opens and relay B opens. Condenser CT is discharged through 729, 724 of relay B and through 722 and C3 then closed of relay C and through coil 750 of discharge test relay RE1 to ground (circuit V, Fig.

8). RE1 is momentarily energized and closes its contacts 751, 752 which connect coil 755 of test holding relay RE2 with line 10 and ground through the circuit VI (Fig. 8); line 10, contacts 744, 745 (then closed) of relay 740, contacts 751, 752 of relay RE1, coil 755, and normally closed switch SW3 which is grounded. Contacts 756, 757 of relay RE2 close to parallel contacts 751, 752 of relay RE1 which are closed only for an instant during the discharge test of condenser CT. Relay RE2 holds closed during the capacity test cycle. Switch SW5 (circuit VII, Fig. 8) is closed to connect coil 723c of relay C with line 10. Relay C opens its contacts 722, 722a in circuit V to disconnect condenser CT from coil 750 of relay RE1 and opens its contacts 723, 723a in circuit III to restore relay 740 to normal, and closes its contacts C15, 722 (circuit VIII, Fig. 8) to connect condenser CT with the lamp 713 and resonant circuit including parts 720 and 721. Relay RE2 closes its contacts 758, 759 preparatory to the functioning of low capacity test relay RE3 whose coil 760 is connected with the plate 709 of low capacity test tube 701. If the capacity of the condenser CT is above the low limit, tube 701 passes current to coil 760 of relay RE3 which then closes its contacts 761, 762 and 763, 764. If the capacity of the condenser CT is not above the high limit, tube 702 does not pass current to coil 770 of high capacity test relay RE5 and its contact 771 engages 772. Line 2 (circuit IX, Fig. 8) is connected with contacts 758, 759 of RE2 connected with contacts 761, 762 of RE3 connected with contacts 771, 772 of RE5 connected with normally closed contacts 781, 782 of relay A connected with solenoid X connected with line 1. Solenoid X is energized and the ejector is disabled and the good condenser CT is not ejected.

(B) Test cycle of a condenser which fails to pass the flash test: Condenser CT passes current through coil 733 (circuit II, Fig. 8) and relay 735 closes its contacts 736, 737 (circuit III) and passes current through coil 739 of relay 740 which closes its contacts 744, 746 (circuit III) and closes its contacts 741, 742 (circuit IV) to connect coil 743 of short counter CO3 with lines 1 and 2. Since the condenser CT has no discharge to energize relay RE1, solenoid X is not energized and the ejector remains operative and the condenser is ejected.

(C) Test cycle for a condenser which passes the flash test but not the discharge test. Relay RE1 is not energized as in test (A). Relay RE2 does not close and solenoid X is not energized and the ejector remains operative and the condenser is ejected.

(D) Test cycle for a condenser which passes the flash test, the discharge test, but the capacity is too low. Relay RE1 and RE2 close as in test A, but relay RE3 does not close. Contacts 761, 762 of relay RE3 being open, lines 1 and 2 are not connected with solenoid X and the condenser is ejected. Because relay RE3 was not energized, its contacts 763, 764 remain normally closed, and coil 785 of relay RE4 (operating when the capacity is either too low or too high) is energized through the circuit X (Fig. 8): ground, coil 785, normally closed contacts 783, 784 of relay A, normally closed contacts 763, 764 of relay RE3, closed contacts 757, 756 of then energized relay RE2, normally closed contacts 744, 745 of deenergized relay 740, line 10. Contacts 786, 787 of relay RE4 (circuit XI, Fig. 8) close to connect line 10 with coil 790 of relay RE6 and with ground through normally closed switch SW1. Contacts 791, 792 of relay RE6 close to parallel contacts 781, 782 of relay RE4; and contacts 793—794 of relay RE6 close to connect lines 1 and 2 with trap valve operating solenoid Y and with counter operating solenoid 795 (circuit XII, Fig. 8). Its counter counts a failed condenser and the trap valve operates to cause the ejected condenser to be diverted from the chute through which descend those condensers which have failed in the short and discharge tests to the chute through which descend those condensers which have failed in the capacity test.

(E) Test cycle for a condenser which passes the flash test low capacity test and the capacity is too high. Coil 770 of relay RE5 is energized by tube 702 and contact 771 leaves 772 and engages 773 and contact 774 engages 775 (circuit XIII, Fig. 8). The energizing circuit of solenoid X is interrupted at 772—771 (circuit IX). The trap-valve solenoid Y and the counter solenoid 795 are energized as in test (D) as described with reference to circuits XI and XII.

Relay B is the all-test control relay which first establishes a connection of the condenser with the high voltage D. C. source or between the condenser and a discharge circuit and between the condenser and the resonant circuit.

Relay 735 is the condenser-short-circuit sensing relay which is energized in response to passing direct current by the condenser.

Relay 740, energized in response to energization of relay 735, is the short counter solenoid (CO3) control relay and also a further test-preventing relay because, if it is energized, relay R2 will not be energized.

Relay R1 is a condenser discharge sensing relay. Relay R2 is a capacity-test-preparation relay energized if relay R1 is energized and if relay 740 is not energized.

Relay C is a switching-relay for disconnecting the condenser for the discharge circuit and connecting it with the resonant circuit.

Relay RE3 is the sufficient-capacity-sensing relay and relay RE5 is the excessive-capacity-sensing relay.

Solenoid X is the electromagnet which, if energized, prevents the operation of a device, such as the condenser ejector, which, if it operated would indicate condenser failure because a condenser would be removed from the conveyor.

Solenoid Y is the electromagnet which, if energized, would operate a trap valve so that the condenser failing the capacity test would move out the capacity failure chute rather than the short and discharge failure chute thus indicating which of the condensers had passed the short-circuit and discharge tests but had failed in the capacity test.

A green lamp 796 is connected with lines 1 and 2 when RE3 is energized through the following circuit: line 1, lamp 796, contacts 761, 762 of RE3, contacts 758, 759 of RE2 (holds closed during test). Lamp 796 shows green when the capacity of CT is at the low limit or higher, but does not burn when the capacity of CT is below the low limit. A red signal lamp is connected with lines 1 and 2 when RE5 as well as RE3 is energized through the following circuit: line 1, lamp 797, contacts 771, 773 of energized relay RE5, closed contacts 761, 762 of energized relay RE3, closed contacts 758, 759 of energized relay RE2. If the capacity of condensers CT is too high both lamps 796, 797 burn.

A relay set switch 798 can be manually closed to contact magnet coil 780 of relay RE4 with line 10 through the following circuit: ground, coil 780, normally closed contacts 783, 784 of deenergized relay A, normally closed contacts 763, 764 of deenergized relay RE3, switch 798, line 10.

To adapt the capacity test apparatus for testing condensers having different capacity limits other condensers are connected in the resonant circuit together with the condenser CT. Fig. 4 shows that line 15 is connected with a padder 800 having condensers 801, 802, 803 which can be connected in various ways by switches 804, 805, 806.

Cam 320 (Fig. 5) has a low land 320a which allows roller 321 and arm to move right by a spring to close normally open switch SW5 which controls energization of relay C for the capacity test which occurs after the flash (shortcircuit) test. Cam 470 has a low land 470a which allows roller 471 and lever 472 to move right while roller 321 is on the high land of cam 320 in order to close switch SW4 which energizes relay B for the flash test which occurs before the capacity test. After the flash and capacity tests, the bump 470b of cam 470 opens switch SW3 to deenergize relay RE2 if it had been energized. Cam 460 has a low land 460a for receiving roller 461 to deenergize relay RE4 at the time bump 470b opens switch SW3 to deenergize relay RE2. Roller 461 and lever 462 move right and switch SW2 is closed to energize relay A and the circuit of solenoid X will be broken at 781, 782 momentarily in order to make sure that the solenoid X is deenergized before the test cycles are repeated. Cam 460 has a bump 460b for opening the switch SW1 which deenergizes relay RE6. Thus at the end of a revolution of the cam shaft 161 the testing circuits are restored to normal status.

Summary

The machine provides automatic removal at the first ejection station of condensers from the conveyor when they do not pass the tests. The condensers which are ejected at the first ejecting station pass out a first chute if they have failed to pass the short circuit test or the discharge test; but if they have passed these tests and fail to pass the capacity test because their capacity is either too low or too high, they drop from a second chute. Only good condensers remain on the conveyor.

The machine operated ejector is normally operative, but is disabled automatically by means responsive to the energization of solenoid SOL X which is energized provided four conditions are satisfied, namely:

(1) Condenser passes short circuit test (relay 740 is not energized);

(2) Passes the discharge test (relay RE2 is energized);

(3) Passes the low capacity test (relay RE3 is energized);

(4) Passes the high capacity test (relay RE5 is not energized).

Failure to pass the short circuit test causes counter CO3 to add.

Operation of the capacity rejection counter CO4 and the trap valve (for descent to the second chute) depends on energization of relay RE6 which depends on energization of relay RE4 which depends on the following:

(a) Non-energization of relay 740 (short circuit test passed)

(b) Energization of relay RE2 (discharge test passed)

Either (c) non-energization of relay RE3 (too low capacity)

Or (d) energization of relay RE5 (too high capacity).

The condenser may pass the short circuit test but, if the discharge test is not passed, RE4 is not energized and the condenser drops from the first chute into a container which receives all condensers which have failed in either of these tests.

The test apparatus is automatically controlled by cams operating in timed relation, as follows:

(1) Cam 470 (Fig. 6) operates first, to energize relay B to effect the charging of the condenser by high voltage direct current and then to deenergize relay B to permit the condenser to discharge to coil 750 of relay RE1.

(2) Cam 320 operates to connect the condenser into the resonant circuit for the capacity test and to release relay 740 if this relay had been energized because the condenser failed to pass the short-circuit test, and then to release relay C.

(3) Cam 460 operates to open normally closed switch SW1 to release relay RE6 to permit counter solenoid SOL7 and trap valve operating solenoid SOL Y to return to normal status.

(4) Cam 470 operates to open normally closed switch SW3 to release relay RE2 and cam 460 operates to close normally open switch SW2 which energizes relay A which opens contacts 781, 782 to deenergize solenoid SOL X (if it had been energized just before), and which opens contact 783, 784 to deenergize relay RE4.

Relays 735 and RE1 operate only momentarily.

At the end of the test cycle all relay magnets and all of the solenoids are deenergized and the test apparatus is in condition to repeat the test cycle.

While the embodiment of the present invention as herein disclosed, constitutes a preferred form, it is to be understood that other forms might be adopted, all coming within the scope of the claims which follow.

What is claimed is as follows:

1. Condenser test apparatus having a resonant circuit for actuation by an alternating current source, said circuit including an inductance and a device sensitive to the amount of current passed by the condenser when connected into the resonant circuit, means for connecting the condenser with the resonant circuit, a first instrument under control by the device and which will pass current when the condenser passes at least a minimum current corresponding to a minimum allowable capacity of the condenser, a second instrument under control by said device and which will pass current when the condenser passes more than a maximum current corresponding to a maximum allowable capacity of the condenser, a first relay energized by current passed by the first instrument, a second relay energized by current passed by the second instrument, a work holder receiving the condenser while under test, an electromagnet which, if not energized, permits operation of a device indicating capacity test failure, and a circuit established by the energization of the first relay and the non-energization of the second relay for connecting the electromagnet with a current source.

2. Condenser test apparatus having a resonant circuit for actuation by an alternating current source, said circuit including an inductance and a lamp whose light intensity varies according to the amount of current passed by the condenser when connected with the resonant circuit, means for connecting the condenser with the resonant circuit, two photoelectric cells activated by the lamp, two thyratron tubes having their grid biases, respectively, under control by the cells and being so adjusted that one tube will pass current when the condenser passes at least a minimum current corresponding to a minimum allowable capacity of the condenser and that the other tube will pass current when the condenser passes more than a maximum current corresponding to a maximum allowable capacity of the condenser, a first relay energized by current passed by the first thyratron, a second relay energized by current passed by the second thyratron, an electromagnet which, if not energized, permits operation of a device indicating capacity test failure, and a circuit established by the energization of the first relay and the non-energization of the second relay for connecting the electromagnet with a current source.

3. Condenser test apparatus having a connection to be made with the condenser to be tested, a connection with a high voltage D. C. source, a resonant circuit including the condenser to be tested, an inductance, an A. C. source and a device sensitive to the amount of current passed by the condenser when connected into the resonant circuit, a first instrument under control by the device and which will pass current when the condenser passes at least a minimum current corresponding to a minimum allowable capacity of the condenser, a second instrument under control by said device and which will pass current when the condenser passes more than a maximum current corresponding to a maximum allowable capacity of the condenser, a mechanism for making an electrical connection of the condenser with the test apparatus during the test cycle, a mechanism for making an electrical connection through the test apparatus with a high voltage D. C. source for the short circuit test, a first relay energized in response to the condenser passing appreciable direct current during condenser charge, said second mechanism making electrical connection to effect discharge of the condenser after the short circuit test period, a second relay which is energized provided the first relay is not energized and provided the condenser discharge is satisfactory, a third mechanism for connecting the condenser into the resonant circuit, a third relay energized by current passed by the third instrument, a fourth relay energized by current passed by the fourth instrument, a mechanism which, by its operation, indicates failure of the condenser to pass tests, an electromagnet which, if energized, prevents operation of the mechanism last mentioned, a circuit connecting the electromagnet with a current source which is established by non-operation of the first and fourth relays and by operation of the second and third relays, and means for operating the mechanisms in timed relation.

4. Condenser test apparatus having a connection to be made with the condenser to be tested, a connection with a high voltage D. C. source, a resonant circuit including the condenser to be tested, an inductance, an A. C. source and a lamp whose light intensity varies according to the amount of current passed by the condenser when connected into the resonant circuit, two photoelectric cells activated by the lamp, two thyratron tubes having their grid biases, respectively, under control by the cells and being so adjusted that one tube will pass current when the condenser passes at least a minimum current corresponding to a minimum allowable capacity of the condenser and that the other tube will pass current when the condenser passes more than a maximum current corresponding to a maximum allowable capacity of the condenser, a mechanism for making an electrical connection of the condenser with the test apparatus during the test cycle, a mechanism for making an electrical connection through the test apparatus with a high voltage D. C. source for the short circuit test, a first relay energized in response to the condenser passing appreciable direct current during condenser charge, said second mechanism making electrical connection to effect discharge of the condenser after the short circuit test period, a second relay which is energized provided the first relay is not energized and provided the condenser discharge is satisfactory, a third mechanism for connecting the condenser into the resonant circuit, a third relay energized by the passing of current by the first thyratron, a fourth relay energized by the passing of current by the second thyratron, a mechanism which, by its operation, indicates failure of the condenser to pass tests, an electromagnet which, if energized, prevents operation of the mechanism last mentioned, a circuit for connecting the electromagnet with a current source which is established by non-operation of the first and fourth relays and by operation of the second and third relays, and means for operating the mechanisms in timed relation.

5. Apparatus according to claim 3 further characterized by the provision of a second device which, by its operation, determines which of the tested condensers have failed in the capacity test, a second electromagnet which, if energized, causes operation of said second device, a circuit for connecting the second electromagnet with a current source established either by virtue of non-operation of the third relay or by operation of the fourth relay.

6. Condenser test apparatus providing a connection with the condenser to be tested, a connection with a high voltage D. C. source, a resonant circuit including the condenser to be tested, an inductance, an A. C. source and a device sensitive to the amount of current passed by the condenser when connected into the resonant circuit, an all-test control relay for making either a connection between the condenser and the D. C. source or between the condenser and a discharge circuit and between the condenser and the resonant circuit, a condenser short-circuit-sensing relay energized in response to passing direct current by the condenser, a further-test-preventing relay energized in response to energization of the short-circuit-sensing relay, a condenser-discharge-sensing relay sensing condenser discharge through the discharge circuit, a capacity-test-preparation relay energized if the discharge-sensing relay is sufficiently energized and the further-test-preventing relay is not energized, a relay for switching the condenser from the discharge circuit to the resonant circuit, a sufficient-capacity sensing relay energized if current sensed by the device is commensurate at least with minimum allowable capacity, an excessive-capacity sensing relay energized if current sensed by the device exceeds a value commensurate with maximum allowable capacity, a device which by its operation, indicates condenser failure, an electromagnet which, if energized, disables said device, a circuit for connecting the electromagnet with a current source and having a series of connections which are made by energization of the capacity-test-preparation relay, energization of the sufficient-capacity sensing relay and by the excessive-capacity sensing relay if not energized, and a mechanism which operates to control the timing of the operation said all-test control relay, said capacity-test-preparation relay, said switching-relay and said device.

7. Apparatus according to claim 6 having also a tell-tale relay which is energized in response either to non-energization of the sufficient-capacity-sensing relay or to energization of the excessive-capacity-sensing relay, a second device which, by its operation, indicates which ones of the condenser failures are capacity-test failures, a second electromagnet which, if energized cause operation of said second device, and means for connecting the second electro-magnet with a current source and rendered operative if the tell-tale relay is energized.

FLOYD J. FOUST.
WILLARD C. SHAW.
HILTON J. McKEE.
WARREN M. RIDER.
J. S. BURGE.

REFERENCES CITED

The following references are of record in the file of this patent:

UNITED STATES PATENTS

| Number | Name | Date |
| --- | --- | --- |
| 1,692,700 | Rae | Nov. 20, 1928 |
| 1,786,910 | Jones | Dec. 30, 1930 |
| 1,853,639 | Robinson | Apr. 12, 1932 |
| 1,873,125 | Holmes et al. | Aug. 23, 1932 |
| 2,016,455 | Purdy | Oct. 8, 1935 |
| 2,059,398 | Roemer | Nov. 3, 1936 |
| 2,144,708 | Rau | Jan. 24, 1939 |
| 2,200,863 | Schuck | May 14, 1940 |
| 2,231,408 | Fechheimer et al. | Feb. 11, 1941 |
| 2,254,117 | Keller | Aug. 26, 1941 |
| 2,362,691 | Gaiser | Nov. 14, 1944 |
| 2,373,079 | Morelock | Apr. 3, 1945 |